US009910487B1

(12) United States Patent
Abrams et al.

(10) Patent No.: US 9,910,487 B1
(45) Date of Patent: Mar. 6, 2018

(54) METHODS, SYSTEMS AND COMPUTER PROGRAM PRODUCTS FOR GUIDING USERS THROUGH TASK FLOW PATHS

(71) Applicant: CA, Inc., Islandia, NY (US)

(72) Inventors: Howard Abrams, San Mateo, CA (US); Debra Danielson, Skillman, NJ (US); Mark Addleman, Alameda, CA (US)

(73) Assignee: CA, Inc., Islandia, NY (US)

( * ) Notice: Subject to any disclaimer, the term of this patent is extended or adjusted under 35 U.S.C. 154(b) by 309 days.

(21) Appl. No.: 13/968,632

(22) Filed: Aug. 16, 2013

(51) Int. Cl.
*G06F 3/01* (2006.01)

(52) U.S. Cl.
CPC ...................................... *G06F 3/01* (2013.01)

(58) Field of Classification Search
CPC .... G06Q 10/06; G06Q 10/10; G06Q 10/0633; G06Q 10/00; G06F 8/20; G06F 8/60; G06F 9/06; G06F 15/173; H04L 9/32
USPC .......... 715/764, 763, 771; 705/7.27
See application file for complete search history.

(56) References Cited

U.S. PATENT DOCUMENTS

| 2004/0046792 | A1* | 3/2004 | Coste ....................... G09B 7/00 715/763 |
| 2006/0174222 | A1* | 8/2006 | Thonse ..................... G06F 8/10 717/106 |
| 2007/0078531 | A1* | 4/2007 | Adra ....................... G06Q 10/00 700/31 |
| 2007/0192118 | A1* | 8/2007 | Bukovec ........................... 705/1 |
| 2007/0214495 | A1* | 9/2007 | Royer ..................... G06F 21/41 726/2 |
| 2007/0250335 | A1* | 10/2007 | Hodges .................. G06Q 10/06 705/7.27 |
| 2009/0307162 | A1* | 12/2009 | Bui et al. ........................ 706/12 |
| 2010/0174579 | A1* | 7/2010 | Hughes ............ G06Q 10/06311 705/7.13 |
| 2011/0078426 | A1* | 3/2011 | Stoitsev ........................ 712/244 |
| 2011/0137702 | A1* | 6/2011 | Hodges .................. G06Q 10/06 705/7.27 |
| 2011/0301996 | A1* | 12/2011 | Johnson ................. G06Q 10/06 705/7.26 |
| 2012/0124197 | A1* | 5/2012 | Ghai ....................... H04L 43/12 709/224 |
| 2012/0323835 | A1 | 12/2012 | Deshpande et al. |
| 2013/0103441 | A1* | 4/2013 | Doganata et al. ........... 705/7.12 |
| 2013/0159061 | A1* | 6/2013 | Fessler ................... G06Q 10/06 705/7.36 |
| 2014/0074545 | A1* | 3/2014 | Minder .................. G06Q 50/01 705/7.27 |
| 2014/0129285 | A1* | 5/2014 | Wu et al. ..................... 705/7.27 |
| 2014/0257835 | A1* | 9/2014 | Kashyap ............ G06Q 10/0633 705/2 |

(Continued)

*Primary Examiner* — Sang H Kim
(74) *Attorney, Agent, or Firm* — Sage Patent Group (57) ABSTRACT

A current task flow path of a user is identified based on task flow nodes of the current task flow path, and a data context of the task flow nodes. The task flow nodes may include actions performed by the user with one or more software applications. A suggestion point of the current task flow path is detected. The suggestion point may be detected based upon a user action indicating that the user needs assistance to proceed with the current task flow path. A candidate task flow node is selected responsive to a comparison of the current task flow path to historical task flows. A suggestion is displayed to the user based on the candidate task flow node.

26 Claims, 6 Drawing Sheets

(56) References Cited

U.S. PATENT DOCUMENTS

2014/0310318 A1* 10/2014 Armstrong et al. .......... 707/803

* cited by examiner

FIGURE 8

METHODS, SYSTEMS AND COMPUTER PROGRAM PRODUCTS FOR GUIDING USERS THROUGH TASK FLOW PATHS

TECHNICAL FIELD

The present disclosure relates generally to computer systems and computer applications.

BACKGROUND

Software users may seek to accomplish a software-related objective over a series of steps of a task flow. Some steps of the task flow may involve using multiple software applications, some of which may have heterogeneous operations based in a cloud network. The data and context may also vary for different steps.

A user operating a software application may wind up on a task flow decision tree that leads to an unsuccessful result. Unaware of other users that have followed this unsuccessful path, it may be too late, somewhat difficult or inefficient to return to the task flow point where a different decision would have led to a better result.

BRIEF SUMMARY

According to some embodiments, a current task flow path of a user is identified based on task flow nodes of the current task flow path and a data context corresponding to the task flow nodes. A task flow is a series of task flow nodes for accomplishing an objective. The task flow nodes may include actions performed by the user with one or more software applications. A suggestion point of the current task flow path is detected. A candidate task flow node is selected responsive to a comparison of the current task flow path to historical task flow information. A suggestion is displayed based on the candidate task flow node. In further embodiments, two or more applications may be involved in actions of the current task flow path.

In some embodiments, a scenario view of the candidate task flow node is displayed. The scenario view of the candidate task flow node may include a view of the candidate task flow node customized based on the data context. A probability of success may be displayed with the suggestion. The probability of success may be based on the historical task flow information, the data context and the comparison.

In some embodiments, positive historical task flow information may be captured in response to completion of a task flow path. Negative historical task flow information may be captured in response to an abandonment or negative result of a task flow path.

In some embodiments, metadata is generated based on a positive or negative result of a task flow path, associated with the task flow path and used in the comparison.

Some other embodiments are directed to related methods, systems and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Embodiments of the present disclosure are illustrated by way of example and are not limited by the accompanying figures with like references indicating like elements.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented as entirely hardware, entirely software (including firmware, resident software, micro-code, etc.) or combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Investigation of a problem with the assistance of software applications can be hard, with lots of trial and error, and lots of dead ends. By suggesting a corrected course of action, the embodiments described herein help guide the user to a more positive outcome based on what previous users may have done in similar situations. A user may receive suggestions for task flow progression learned from aggregated historical path information and/or data context.

According to some embodiments, a data context may include the data entered or selected in the task flow. The data context may provide a contextual environment or correspond to a type of application. For example, the data context of the task flow nodes may include data and software applications for various contexts, such as databases, financial tools, social media applications, specific business applications, etc.

According to some embodiments, historical task flow information may include historical task flows, which may be positive or negative. Historical task flow information may include data contexts, results, metadata, user behavior or other information associated with task flow nodes of historical task flows. Such historical information may be used for a comparison to task flow nodes of a current task flow path.

Embodiments of the disclosure enable a user to look at data from an aggregated set of users within or across enterprises and use that data to determine if the user is potentially headed down the wrong path in investigating a problem and should be suggested to change course based on what previous users have done in similar situations. Graphical tools and statistics may better inform a user's path or branch decision.

Path Identification and Comparison

Figure 1:
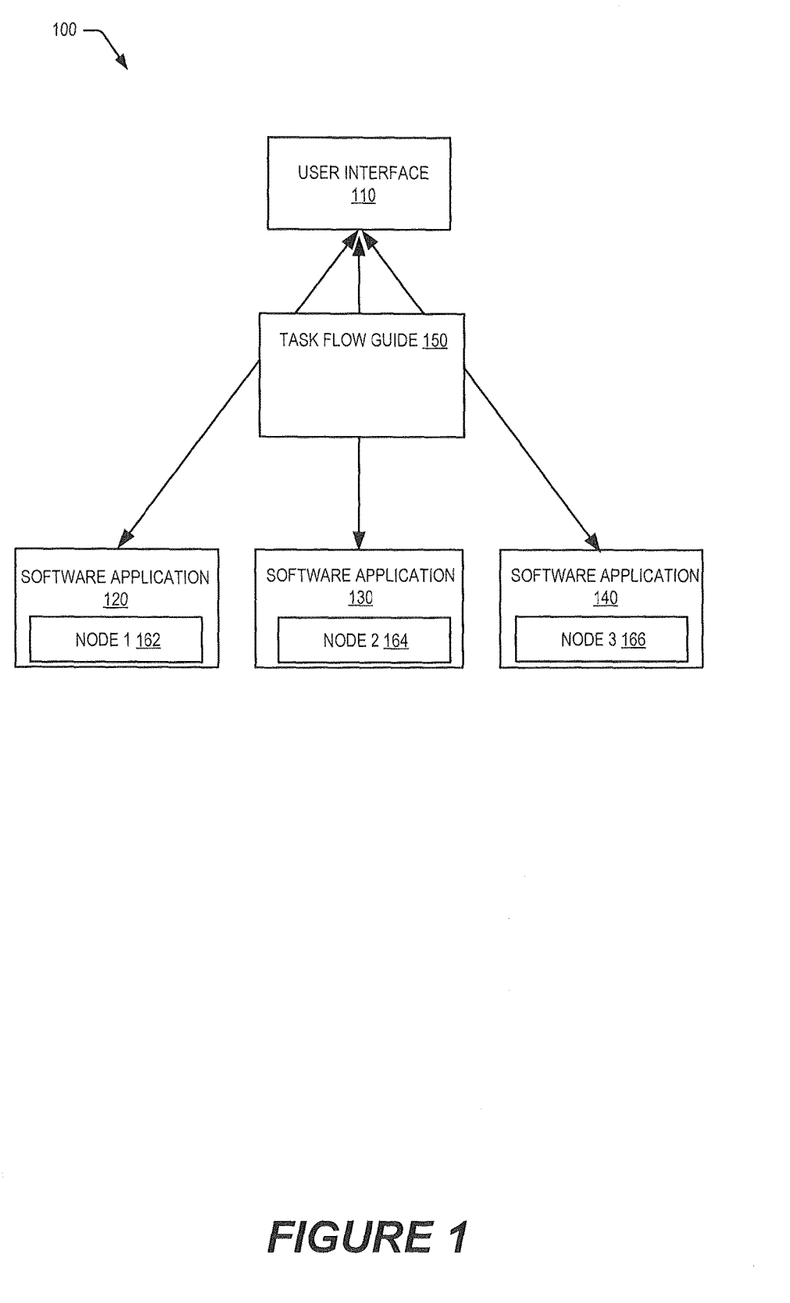
FIG. 1 is a block diagram of a system for task flow guidance, according to various embodiments described herein.

When a user embarks on a current task flow path, the system may identify, learn, predict and/or anticipate the path that the user is likely following based on the data context and the path decisions of the user. FIG. 1 is a block diagram illustrating a system 100 for task flow guidance, according to some embodiments. A user may interact with software components 120-140 through user interface 110. Task flow guide 150 may monitor user actions with software applications 120-140. For example, a current task flow may have an action performed with software application 120, the action characterized as node 1 162. Another action may be performed as part of the current task flow path. This action may use software application 130 and be characterized as node 2 164. Likewise, node 3 166 may characterize an action performed with software application 140. Nodes 162-166 may be part of the current task flow path, which may involve the use one or more software applications.

Nodes may span multiple separate software applications. For example, a database may be one software application and a database query analysis tool may involve another separate software application. Perhaps, the second software application may be considered separate because the name or producer of the application is different or they involve different APIs or code bases.

Figure 2:
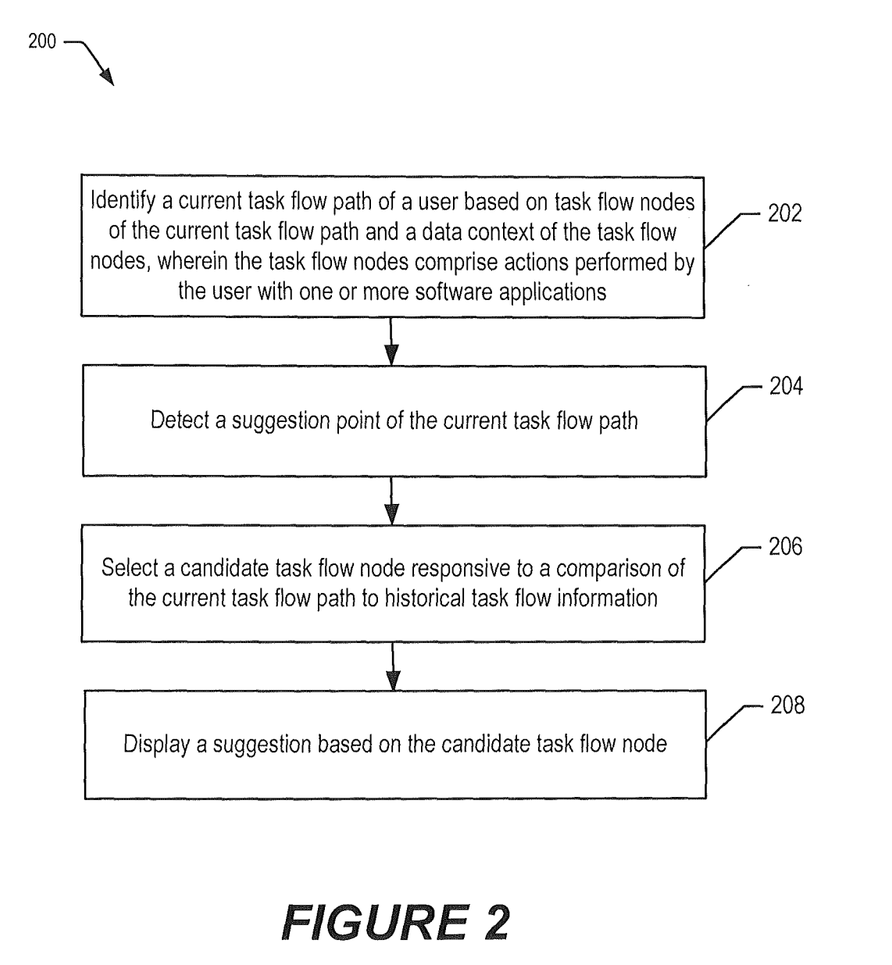
FIG. 2 is a flow chart illustrating a process for task flow guidance, according to various embodiments described herein.

FIG. 2 illustrates a process flowchart 200, according to some embodiments. Blocks 202-208 may be arranged in different combinations or sequences, according to other embodiments. At block 202, task flow guide 150 may identify the current task flow path based on task flow nodes of the current task flow path and a data context corresponding to the task flow nodes. This may involve identifying or categorizing the objective or goal of the user in following the current task flow path. This may also involve analyzing the data context of the task flow nodes. Nodes can vary based on a data context of the nodes. For example, are the task flow nodes actions involving database queries, web applications, reports, business logistics, IT, or other contexts. The data associated with such a data context may also involve parameters or other information that may be used to distinguish a task flow path from other task flow paths and inform task flow guide 150 of a user objective.

Figure 7:
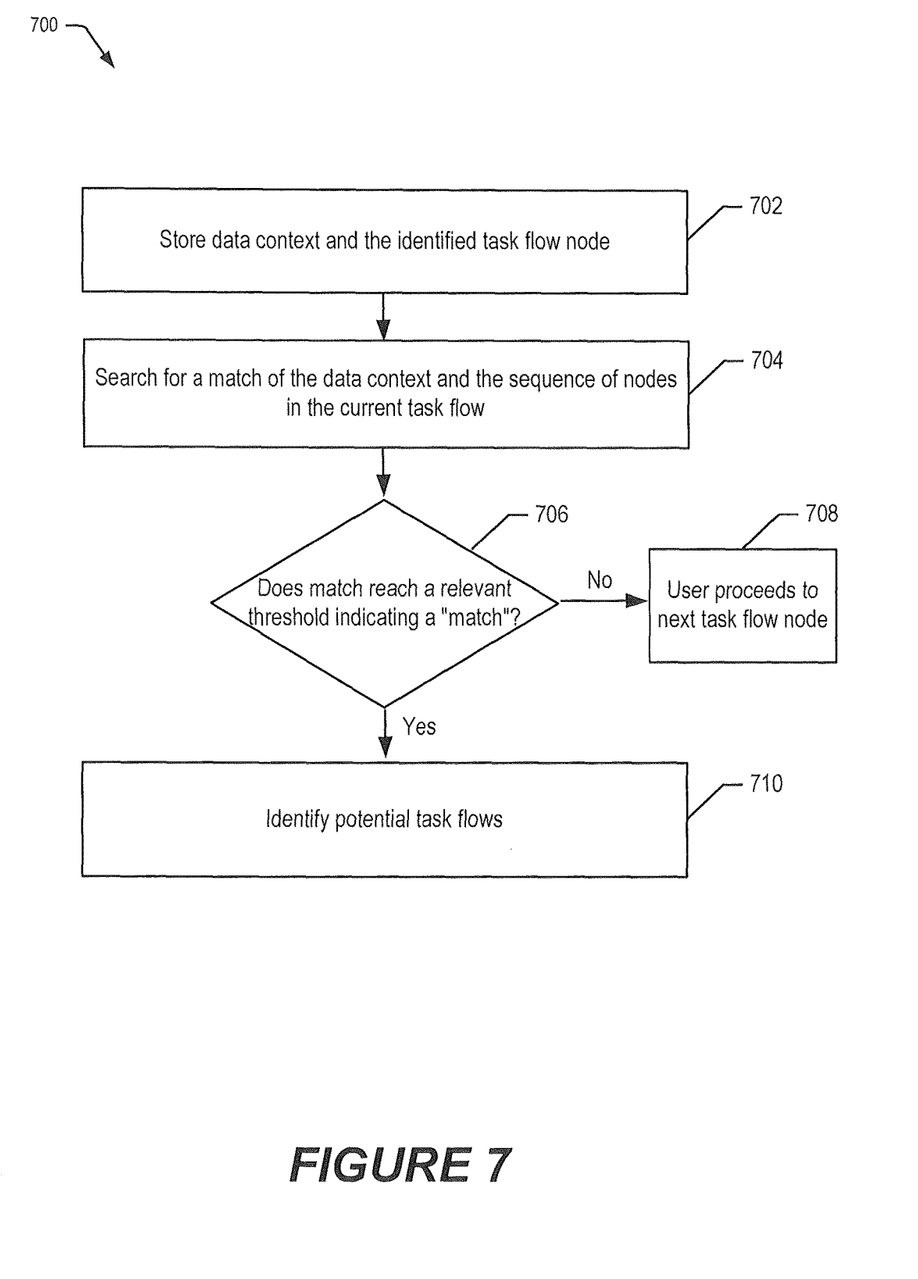
FIG. 7 is a flow chart illustrating a process for task flow identification, according to various embodiments described herein.

Block 202 is further illustrated by the process flow 700 of FIG. 7, according to some embodiments. At block 702, the identified task flow node and/or the data context is stored in a data store, buffer or other data structure. At block 704, a search is performed to find a match for the stored data context and task flow node. This may involve finding data contexts, task flow nodes and/or patterns in the data store that are the same or most similar to the current data context and task flow nodes.

If the match does not meet a match threshold (Decision 706), then no suggestion is determined and the user proceeds to the next task flow node (Block 708). If the match threshold is met, then the task flow has reached a level of identification (Block 710).

Task flow nodes of a user may be useful in identifying that there is a problem to solve, and what the problem is. Task flows may vary in details and data and are not necessarily deterministic. One task flow node has the potential of changing the whole task flow path dramatically. However, comparisons of task flow nodes and data context to historical information may quickly narrow the possible goals or objectives of a user.

Figure 3:
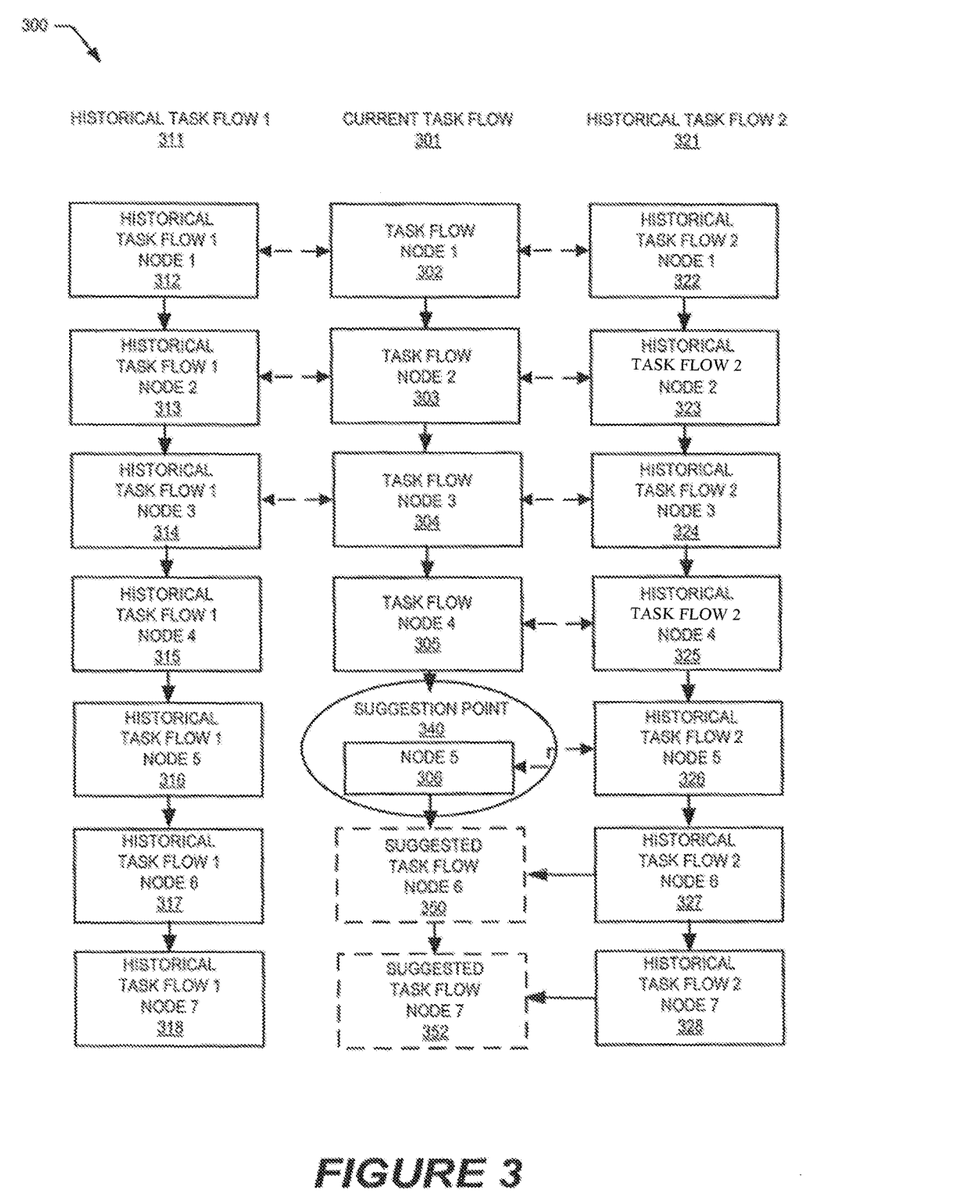
FIG. 3 is a flow chart illustrating a task flow path, according to various embodiments described herein.

FIG. 3 illustrates a flowchart 300 for task flow guidance, according to some embodiments. Current task flow 301 proceeds through task flow nodes 302-305.

At block 204, a suggestion point 340 of the current task flow path 301 is detected. This suggestion point 340 may be detected based on a user action indicating that the user needs assistance to proceed with the current task flow path. If a user appears to stall at node 5 306 or show difficulty in choosing a branch or continuing on the path, the user may be prompted with a suggestion as to which branch to take. The user may also indicate affirmatively in a software application that help is needed.

In some embodiments, the suggestion point 340 may be detected based on an analysis of the current task flow path nodes, the data context and historical task flow information. This analysis may involve comparing current nodes to historical nodes, filtering based on data context and generating a probability measure or value. This probability metric may be compared to a certainty threshold, such as 95% certainty, to determine if there is sufficient information to provide a most reasonable and/or certain suggestion. In other words, if there is a clear answer or suggestion that can be provided to user, the suggestion point may be considered detected and the high certainty suggestion may be provided. The suggestion may be provided even if the user has not yet indicated that assistance is necessary. The certainty threshold may be configured individually or based on a situation.

Various common (and uncommon) statistical and pattern matching techniques may be used to detect that the task flow path is similar enough to historical task flows that it can be considered predictive of the next step and that a specific task flow node is a critical decision point between clusters of successful and unsuccessful historical paths. This is in addition to human selection factors.

At block 206, a candidate task flow node is selected responsive to a comparison of the current task flow path to historical task flows. Historically successful and/or unsuccessful paths may be compared to the current task flow path. The current path may be matched to a learned path. Data contexts, types of applications, specific applications, actions with applications and other information may be used for comparison to filter down to the most likely objective of a user. In some cases, an objective is determined and then historical task flows are selected for comparison based on the determined objective. The identified or predicted path or matching may involve more precision as the user proceeds down the path.

Flowchart 300 of FIG. 3 shows historical task flows 311 and 321, which include task flow nodes 312-318 and task flow nodes 322-328, respectively. Nodes 302-304 of current task flow 301 may be compared to nodes 312-314 of historical task flow 311 and nodes 322-325 of historical task flow 321. It may be determined that historical task flow 321 may be more of a likely match to current task flow 301. Therefore, at task flow node 305 of current task flow 301, only node 326 of historical work 321 is compared for further identification of the objective of current task flow 301.

However, at node 306 of the current task flow 301, the user seems to stall or appear to search for help. For example, a help button may be selected or the user may be going back and forth in a task flow in a display of frustration. There may be a period of inactivity by the user that meets an inaction threshold. In another example, it may be that the objective and next step of the task flow path has reached a point of certainty that a suggestion may be made to the user.

The suggestion point 340 is detected by task flow guide 150 and a comparison is made to one or more historical task flows, such as historical task flow 321. Node 306 may be compared to node 326 of historical task flow 321. This may result in further analysis of nodes 327 and 328 of historical task flow 321. Flowchart 300 is illustrative of some embodiments but not meant to be limiting as to a number or pattern of nodes used for comparison. In some embodiments, nodes may be clustered or involve more complex mappings.

At block 208, a suggestion is displayed, or provided for display, based on the candidate task flow node. Candidate task flow node 350 is selected and a suggestion is generated based on the selection. The suggestion involves a message or indication to the user that node 350 is task flow node or next task flow node in a suggested task flow for the user's identified objective.

The suggestion may include some statistical information about the success rates of the branches and/or a view of what the user experience may be upon choosing the branch. Different user interface display tools may be utilized to display possible scenarios or screenshots for candidate task flow nodes.

Recorded data, which may include context data, may be used to determine why the user performed a certain action. Suggestions or optional scenarios may be generated for the user at one or more decision branches of the current path. Each suggestion may include a probability of success. Statistical analyses may be performed on historical paths in order to provide metrics to assist a user in evaluating whether or not to select a node or branch. Such metrics may be included with suggestions or prompts.

A prompt may be developed to help drive a positive outcome. Example prompts may include notifications that of the 1000 users that have gone down your present path, 88% of them have selected this next branch, which leads to this positive result. In another example, if a certain decision is made or being made that may not lead to a positive result, a suggestion appears stating that 76% of users who have taken this branch get an error situation. Perhaps, an application is not compatible. Another suggestion may involve a suggestion that the user might want to go back and use another suggested tool if the user finds that actions and results are not working out as planned.

Figure 4:
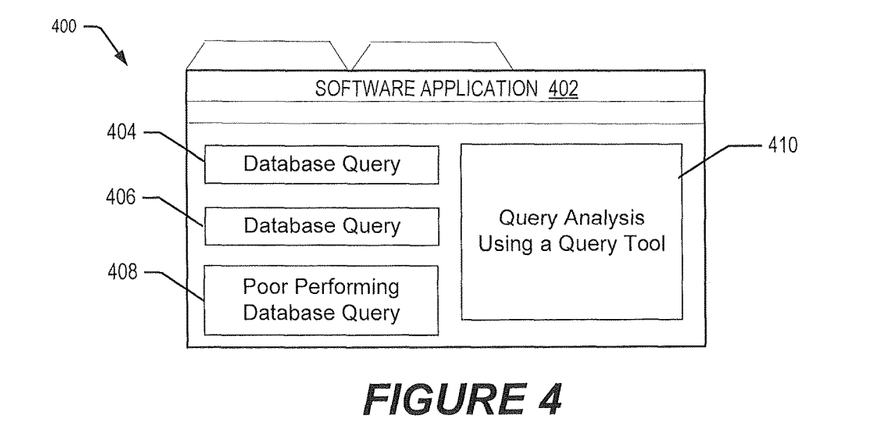
FIG. 4 is a display view of a task flow node, according to various embodiments described herein.
Figure 5:
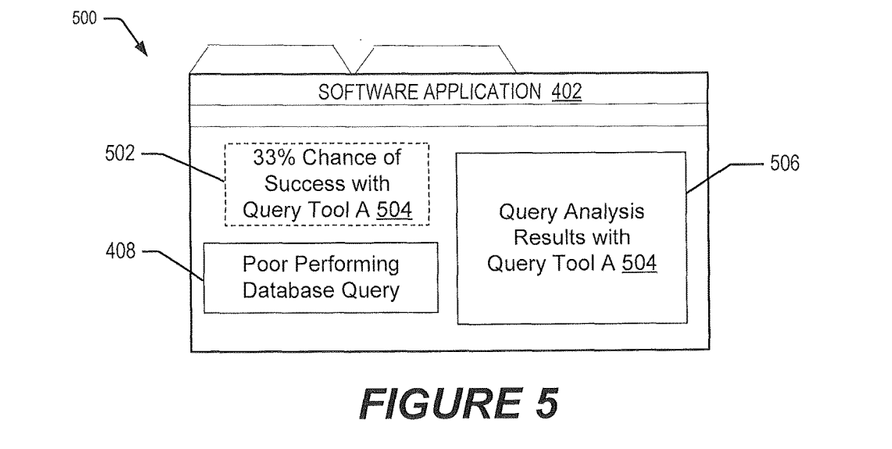
FIGS. 5-6 are display views of suggestions, according to various embodiments described herein.
Figure 6:
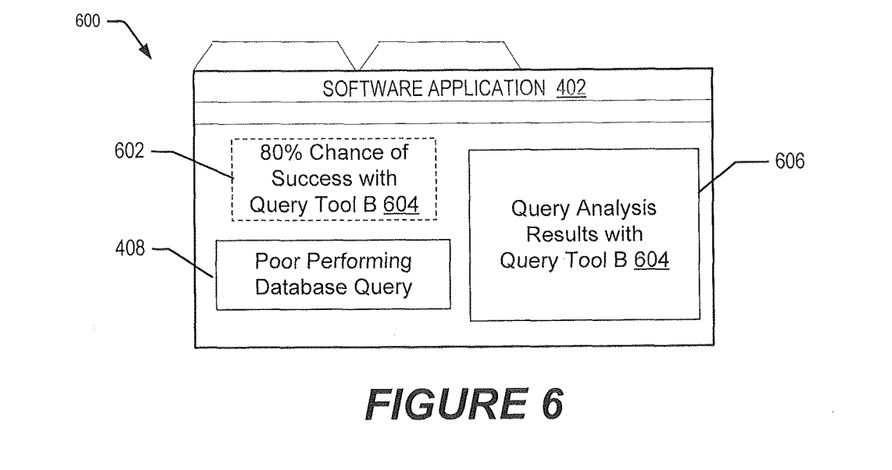

FIGS. 4-6 shows display views of user interface 110, according to some embodiments. The display views are provided as example suggestions of a user that task flow guide 150 has determined is following a task flow for debugging a database problem. Nodes of the example task flow may involve user actions such as listing database tables, selecting a database table, viewing at all the queries to the table, selecting particular queries. The user may be viewing display view 400 in software application 402. The user may sort the database queries 404-408 by performance. The user clicks on the lowest performing database query 408 and then stops. This stop may last longer than a threshold duration of time. A suggestion 410 may appear to open a certain time series tool.

The user may proceed to select database query tool A for analysis. However, this tool has had negative results for solving problems of this type based on data captured in historical task flows. FIG. 5 illustrates display view 500, according to some embodiments, which shows a view 506 of an action that the user is taking to use query tool A 504. Suggestion 502 may be generated and displayed to the user indicating query tool A 504 has had only a 33% chance of success in identifying a reason for the poor performance of a database query. This suggestion may be generated based on the data context, which may be a certain type or brand of database that produced the queries.

View 506 may also be a scenario view, according to some embodiments. A scenario view is not merely text indicating a suggestion or probability, such as suggestion 502. View 506 may be a suggestion that is a scenario view. A scenario view may be a simulated view of what the screen, window or other visual portion of an application may look like if the candidate task flow node is selected. This scenario view may be customized based on the data context. The data may be simulated. The data may also be real based on anticipated function with the anticipated data. The data context may also determine the application or type of application to be displayed in the scenario view.

In some embodiments, a scenario view may show icons of the path pointed to by the candidate task flow node. Multiple predicted futures may be displayed. For example, if there are four very plausible paths based on an analysis, comparison and/or filter of the information, those four plausible paths may be shows in some manner. The scenario view may be generated based on other data context information. In the database example of FIGS. 4-6, data context information may include a type of database, a type of query and even the type of evaluator or sophistication level of the user.

In some embodiments, the scenario view may also show some type of future screenshot display or series of displays for a number of task flow nodes beyond the candidate task flow node. For example, if a user is at a 50/50 split decision at a suggestion point, each option may be shown in a scenario view out for the next few steps. The possible future scenarios may change as the user progresses through the current task flow path.

An example of an alternate scenario view may be shown by FIG. 6. FIG. 6 illustrates display view 600, according to some embodiments, which shows another suggestion 602, indicating that there is an 80% chance of success with query tool B 604. View 606 indicates a display of a possible scenario view of results if user 506 were to follow suggestion 602 to use query tool B 604. The user may be given the option to choose from multiple options in case there are some good reasons not to choose the most tried and true path.

Path Capture

A system user's path and/or data context may be captured into historical task flow information that is recorded. The user's path may be determined to be a success or a failure. Statistics and analytics may be gathered for learned paths that have been collected and aggregated from many users within a single organization or across organizations.

This capture may include data contexts or user selections from the screen or a user interface. This may also include what complex operations the user has actually performed rather than a simple selection from a clean short list of predetermined options or data locations. Data may be obtained from internal operations, anonymous or confidential sources, proprietary cloud environments or from data external to the organization.

Desired outcomes may be captured. A user may indicate a successful outcome, perhaps the user is prompted to so indicate. A success may be marked based on the circumstances (e.g., all green lights) or by matching historical successful outcomes. Otherwise, failure may be determined based on abandonment of the path, errors, explicit indication of a failed path, or other markers of a bad outcome. The system may be seeded with success and failures so that task flows may be identified with less and less user intervention. In further embodiments, experts may help to feed or validate historical information.

Metadata may also be used for marking paths as success or failures, or for linking problems with solutions. Metadata may be other information associated with historical task flows but annotated or recorded independent of or in addition to the historical task flows and historical task flow nodes. Metadata may include data context data and other information that characterizes a captured task flow. This metadata may be used for the comparison of the current task flow nodes and the nodes of the historical task flow information.

The user may have the option of autocompleting a portion of the path, with or without additional input from the user. That is, a user may choose to have task flow guide 150 automatically complete the candidate task flow node with the data context of the current task flow path. Specific inputs may be requested as part of an automated task flow. Task flow guide 150 may also complete further predicted task flow nodes if the user or task flow guide 150 has confidence of the objective and next steps of the task flow path. In some cases, the task flow may be completed to completion of the task flow path, using the data context of the current task flow in place of the data context of a historical task flow that is determined to be a match.

Various embodiments of the disclosure may provide for more efficient task flows when users are better informed based on contextual and historical information.

As will be appreciated by one skilled in the art, aspects of the disclosure may be embodied as a method, data processing system, and/or computer program product. Furthermore, embodiments may take the form of a computer program product on a tangible computer readable storage medium having computer program code embodied in the medium that can be executed by a computing device.

Figure 8:
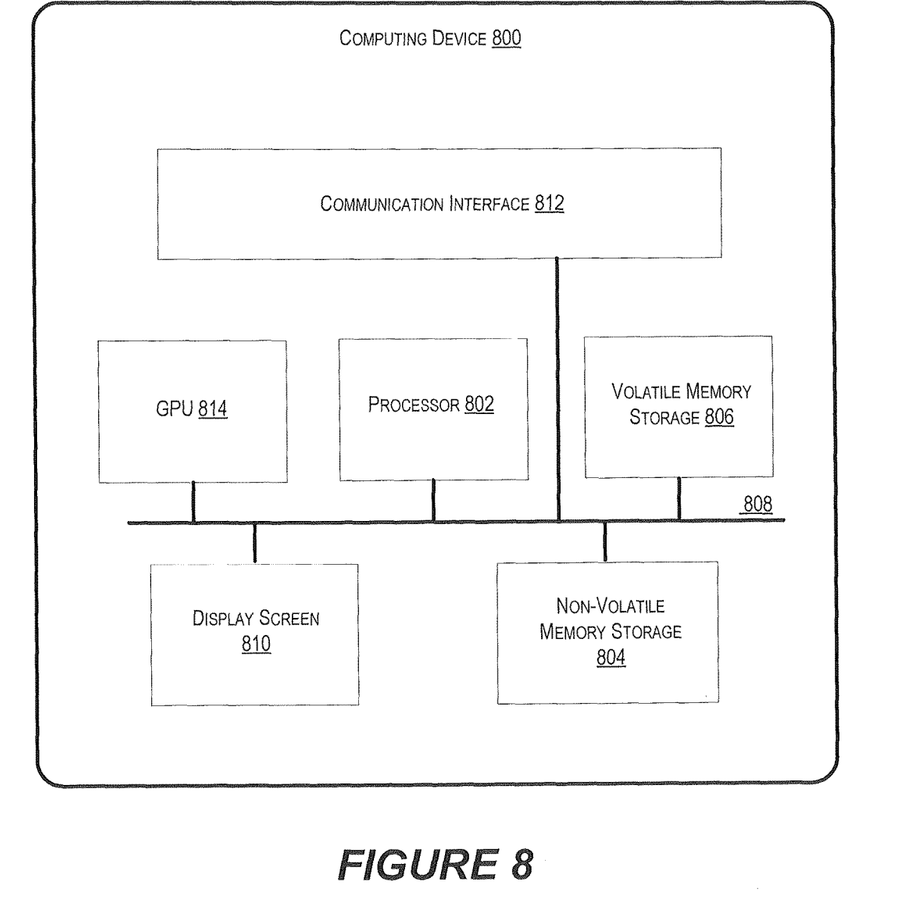
FIG. 8 is a block diagram of a computing device in which embodiments can be implemented.

FIG. 8 is an example computer device 800 in which embodiments of the present disclosure, or portions thereof, may be implemented as computer-readable code. For example, the components of task flow guide 150 and/or any other components of system 100, flowcharts 200-300 and/or display views 400-600 may be implemented in one or more computer devices 800 using hardware, software implemented with hardware, firmware, tangible computer-readable storage media having instructions stored thereon, or a combination thereof and may be implemented in one or more computer systems or other processing systems. Computer devices 800 may also be virtualized instances of computers. Components and methods in FIGS. 1-7 may be embodied in any combination of hardware and software.

Computing device 800 may include one or more processors 802, one or more non-volatile storage mediums 804, one or more memory devices 806, a communication infrastructure 808, a display screen 810 and a communication interface 812. Computing device 800 may also have networking or communication controllers, input devices (keyboard, a mouse, touch screen, etc.) and output devices (printer or display).

Processor(s) 802 are configured to execute computer program code from memory devices 804 or 806 to perform at least some of the operations and methods described herein, and may be any conventional or special purpose processor, including, but not limited to, digital signal processor (DSP), field programmable gate array (FPGA), application specific integrated circuit (ASIC), and multi-core processors.

GPU 814 is a specialized processor that executes instructions and programs, selected for complex graphics and mathematical operations, in parallel.

Non-volatile memory storage 804 may include one or more of a hard disk drive, flash memory, and like devices that may store computer program instructions and data on computer-readable media. One or more of non-volatile storage memory 804 may be a removable storage device.

Volatile memory storage 806 may include one or more volatile memory devices such as but not limited to, random access memory. Communication infrastructure 808 may include one or more device interconnection buses such as Ethernet, Peripheral Component Interconnect (PCI), and the like.

Typically, computer instructions are executed using one or more processors 802 and can be stored in non-volatile memory storage 804 or volatile memory storage 806.

Display screen 810 allows results of the computer operations to be displayed to a user or an application developer.

Communication interface 812 allows software and data to be transferred between computer system 800 and external devices. Communication interface 812 may include a modem, a network interface (such as an Ethernet card), a communications port, a PCMCIA slot and card, or the like. Software and data transferred via communication interface 812 may be in the form of signals, which may be electronic, electromagnetic, optical, or other signals capable of being received by communication interface 812. These signals may be provided to communication interface 812 via a communications path. The communications path carries signals and may be implemented using wire or cable, fiber optics, a phone line, a cellular phone link, an RF link or other communications channels. According to an embodiment, a host operating system functionally interconnects any computing device or hardware platform with users and is responsible for the management and coordination of activities and the sharing of the computer resources.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, JavaScript, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PELF', ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Aspects of the present disclosure are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

The breadth and scope of the present invention should not be limited by any of the above-described embodiments or any actual software code with the specialized control of hardware to implement such embodiments, but should be defined only in accordance with the following claims and their equivalents.

What is claimed is:
1. A computer-implemented method, comprising:
  determining, using a computing device, task flow nodes that have been executed by a user, wherein the task flow nodes comprise actions performed by the user with one or more software applications as part of a currently executing task flow path;
  determining, using the computing device, a data context of the task flow nodes, the data context comprising data associated with a type of software application of the task flow node and/or data used by the task flow node as part of the currently executing task flow path;

identifying, using the computing device, the currently executing task flow path of the user based on the determined task flow nodes of the currently executing task flow path and the determined data context of the task flow nodes;

detecting a suggestion point of the currently executing task flow path based upon a user action indicating that the user needs assistance to proceed with the currently executing task flow path, wherein detecting the suggestion point comprises determining that a suggestion certainty measure of an analysis of the currently executing task flow path, historical task flow information, and the data context meets a suggestion certainty threshold to provide a level of certainty that there is sufficient information to provide a suggestion;

selecting a candidate task flow node responsive to a comparison of the currently executing task flow path to the historical task flow information;

generating the selection based on the candidate task flow node that was selected; and displaying the suggestion to the user, wherein displaying the suggestion to the user comprises:
   displaying a probability of success in achieving an identified objective of the currently executing task flow path associated with the suggestion; and
   displaying to the user a scenario view of the candidate task flow node, wherein the scenario view is a simulated visual display of a screen, window, or other visual portion of a respective software application associated with the candidate task flow node as a result of executing the candidate task flow node in the currently executing task flow path.

2. The method of claim 1, wherein the scenario view of the candidate task flow node comprises a view of the candidate task flow node customized based on the data context.

3. The method of claim 2, wherein the scenario view of the candidate task flow node comprises a view of the candidate task flow node comprising simulated data customized based on the data context.

4. The method of claim 1, wherein the displaying the scenario view comprises displaying the scenario view of a following task flow node that is predicted to follow the candidate task flow node.

5. The method of claim 1, wherein the displaying the scenario view comprises displaying a plurality of scenario views corresponding to a plurality of candidate task flow nodes.

6. The method of claim 1, further comprising identifying an objective of the user based on the task flow nodes of the currently executing task flow, and
   wherein the displaying comprises displaying a probability of success in achieving the identified objective associated with the suggestion.

7. The method of claim 6, further comprising calculating the probability of success in achieving the identified objective based on the historical task flow information, the data context and the comparison.

8. The method of claim 1, wherein the task flow nodes comprise actions performed with at least two separate software applications that are included in the currently executing task flow path.

9. The method of claim 1, further comprising capturing positive historical task flow information in response to completion of a task flow path.

10. The method of claim 1, further comprising capturing negative historical task flow information in response to an abandonment or negative result of a task flow path.

11. The method of claim 1, further comprising autocompleting the currently executing task flow path based on a user selection of a candidate task flow node.

12. The method of claim 1, further comprising:
   generating metadata based on a positive result of a task flow path; and
   associating the metadata to the task flow path, wherein the metadata is used in the comparison.

13. The method of claim 1, further comprising:
   generating metadata based on a negative result of a task flow path; and
   associating the metadata to the task flow path, wherein the metadata is used in the comparison.

14. The method of claim 1, wherein the comparison comprises a comparison of user behavior of the currently executing task flow path to behavior of the historical task flow information.

15. A system, comprising:
   a processor; and
   a memory coupled to the processor and comprising computer readable program code embodied in the memory that when executed by the processor causes the processor to perform operations comprising:
   determining task flow nodes that have been executed by a user, wherein the task flow nodes comprise actions performed by the user with one or more software applications as part of a currently executing task flow path;
   determining a data context of the task flow nodes, the data context comprising data associated with a type of software application of the task flow node and/or data used by the task flow node as part of the currently executing task flow path;
   identifying the currently executing task flow path of the user based on the determined task flow nodes of the currently executing task flow path and the determined data context of the task flow nodes;
   detecting a suggestion point of the currently executing task flow path based upon a user action indicating that the user needs assistance to proceed with the currently executing task flow path, wherein detecting the suggestion point comprises determining that a suggestion certainty measure of an analysis of the currently executing task flow path, historical task flow information, and the data context meets a suggestion certainty threshold to provide a level of certainty that there is sufficient information to provide a suggestion;
   selecting a candidate task flow node responsive to a comparison of the currently executing task flow path to the historical task flow information;
   generating the selection based on the candidate task flow node that was selected; and
   displaying the suggestion to the user,
   wherein displaying the suggestion to the user comprises:
      displaying a probability of success in achieving an identified objective of the currently executing task flow path associated with the suggestion; and
      displaying to the user a scenario view of the candidate task flow node, wherein the scenario view is a simulated visual display of a screen, window, or other visual portion of a respective software application associated with the candidate task flow node as a result of executing the candidate task flow node in the currently executing task flow path.

16. The system of claim 15, wherein the scenario view of the candidate task flow node comprises a view of the candidate task flow node customized based on the data context.

17. The system of claim 16, wherein the scenario view of the candidate task flow node comprises a view of the candidate task flow node comprising simulated data customized based on the data context.

18. The system of claim 15, the operations further comprising:
identifying an objective of the user based on the task flow nodes of the currently executing task flow; and
displaying a probability of success in achieving the identified objective associated with the suggestion.

19. The system of claim 15, wherein the task flow nodes comprise actions performed with at least two separate software applications that are included in the currently executing task flow path.

20. The system of claim 15, the operations further comprising:
generating metadata based on a result of a task flow path; and
associating the metadata to the task flow path, wherein the metadata is used in the comparison.

21. The system of claim 15, the operations further comprising:
autocompleting the currently executing task flow path based on a user selection of a candidate task flow node.

22. A computer program product, comprising:
a non-transitory computer readable storage medium having computer readable program code embodied in the medium that when executed by a processor causes the processor to perform operations comprising:
identifying a plurality of task flow nodes comprising actions that have been executed by a user within at least two software applications that are included in a currently executing task flow path, wherein respective ones of the task flow nodes comprise actions performed by the user within the at least two software applications;
identifying a data context of the plurality of task flow nodes comprising a type of the at least two software applications and data entered by the user within the at least two software applications;
identifying the currently executing task flow path of the user and an objective of the currently executing task flow path based on the plurality of task flow nodes and the data context of the plurality of task flow nodes;
detecting a suggestion point of the currently executing task flow path responsive to inactivity of the user or repeated execution by the user of respective ones of the plurality of task flow nodes indicating that the user needs assistance to proceed with the currently executing task flow path, wherein detecting the suggestion point comprises determining that a suggestion certainty measure of an analysis of the currently executing task flow path, historical task flow information, and the data context meets a suggestion certainty threshold to provide a level of certainty that there is sufficient information to provide a suggestion;
responsive to detecting the selection point, selecting a candidate task flow node responsive to a comparison of the currently executing task flow path and the objective of the currently executing task flow path to the historical task flow information;
generating the selection based on the candidate task flow node that was selected; and
displaying the suggestion to the user, wherein the suggestion comprises:
a probability of success in achieving the identified objective of the currently executing task flow path associated with the suggestion; and
a scenario view of the candidate task flow node, wherein the scenario view is a simulated visual display of a screen, window, or other visual portion of a respective software application of the at least two software applications associated with the candidate task flow node as a result of executing the candidate task flow node in the currently executing task flow path.

23. The computer program product of claim 22, wherein the scenario view of the candidate task flow node comprises a view of the candidate task flow node customized based on the data context.

24. The computer program product of claim 23, wherein the scenario view of the candidate task flow node comprises a view of the candidate task flow node comprising simulated data customized based on the data context.

25. The computer program product of claim 22, further comprising computer readable program code causing the processor to perform:
generating metadata based on a result of a task flow path; and
associating the metadata to the task flow path, wherein the metadata is used in the comparison.

26. The computer program product of claim 22, further comprising computer readable program code causing the processor to perform:
autocompleting the currently executing task flow path based on a user selection of a candidate task flow node.

* * * * *